(12) United States Patent
Kong

(10) Patent No.: US 10,628,742 B2
(45) Date of Patent: Apr. 21, 2020

(54) BIDDING METHOD OF DISTRIBUTED ENERGY RESOURCE IN MICRO-GRID BASED ON ARTIFICIAL IMMUNITY

(71) Applicant: Tianjin University, Tianjin (CN)

(72) Inventor: Xiangyu Kong, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 15/509,512

(22) PCT Filed: Apr. 26, 2015

(86) PCT No.: PCT/CN2015/077472
§ 371 (c)(1),
(2) Date: Mar. 8, 2017

(87) PCT Pub. No.: WO2016/078330
PCT Pub. Date: May 26, 2016

(65) Prior Publication Data
US 2017/0286834 A1  Oct. 5, 2017

(30) Foreign Application Priority Data
Nov. 19, 2014  (CN) .......................... 2014 1 0668587

(51) Int. Cl.
  *G06N 3/12* (2006.01)
  *H02J 3/00* (2006.01)
  (Continued)

(52) U.S. Cl.
  CPC ............. *G06N 3/126* (2013.01); *G06N 3/006* (2013.01); *G06N 5/02* (2013.01); *G06N 7/005* (2013.01);
  (Continued)

(58) Field of Classification Search
  None
  See application file for complete search history.

(56) References Cited

U.S. PATENT DOCUMENTS

| 2010/0282460 | A1* | 11/2010 | Stone | E21B 43/2401 166/248 |
| 2012/0185106 | A1* | 7/2012 | Ghosh | G06Q 10/04 700/291 |
| 2016/0356746 | A1* | 12/2016 | Piestun | A61B 5/0095 |

FOREIGN PATENT DOCUMENTS

| CN | 101510685 A | 8/2009 |
| CN | 103346562 A | 10/2013 |

(Continued)

OTHER PUBLICATIONS

Ramachandran, B. et al., "An intelligent auction scheme for smart grid market using a hybrid immune algorithm," IEEE Trans. on Industrial Electronics, vol. 58, No. 10 (Oct. 2011) pp. 4603-4612. (Year: 2011).*

(Continued)

*Primary Examiner* — Kakali Chaki
*Assistant Examiner* — Brian M Smith
(74) *Attorney, Agent, or Firm* — George G. Wang; Bei & Ocean

(57) ABSTRACT

The present invention discloses a micro-grid distributed energy resource bidding method based on artificial immunity including the following steps: processing the collected information by a bidding unit agent to form artificial immune antigen of quotation environmental; performing solving based on artificial immune algorithm to obtain antibody meeting the interest of a distributed energy resource; and decoding the antibody to obtain a bidding scheme of the distributed energy resource. The present invention utilizes artificial immune intelligent algorithm with strong ability of information processing and self-adaption, thus solving the problem of uncontrollable bidding under complicated environment. Uncertainty problem resulted by the intermittent power supply is overcomed by the capability of self-adaption and defect tolerance of arti- (Continued)

ficial immunity during bidding process. In addition, the coordination of entire micro-grid MAS is improves by coordinated evolution of artificial immunity.

1 Claim, 4 Drawing Sheets

(51) Int. Cl.
    *G06N 3/00*     (2006.01)
    *G06N 7/00*     (2006.01)
    *H02J 3/38*     (2006.01)
    *H02J 3/46*     (2006.01)
    *G06N 5/02*     (2006.01)

(52) U.S. Cl.
    CPC .............. *H02J 3/008* (2013.01); *H02J 3/383* (2013.01); *H02J 3/386* (2013.01); *H02J 3/46* (2013.01); *G06N 5/022* (2013.01); *H02J 2203/20* (2020.01); *Y02E 60/76* (2013.01); *Y04S 40/22* (2013.01); *Y04S 50/10* (2013.01)

(56) References Cited

FOREIGN PATENT DOCUMENTS

| CN | 103997062 A | 8/2014 |
|---|---|---|
| CN | 104392269 A | 3/2015 |
| WO | WO2013015773 A1 | 1/2013 |

OTHER PUBLICATIONS

Lakshmi, K. et al., "Hybrid artificial immune system approach for profit based unit commitment problem," J. Electr. Eng. Technology, vol. 8, No. 5 (2013) pp. 959-968. (Year: 2013).*

De Oliveira, L. et al., "Artificial immune systems applied to the reconfiguration of electrical power distribution network for energy loss minimization," Electrical Power and Energy Systems, vol. 56 (2014) pp. 64-74. (Year: 2014).*

Mashhour, E. et al., "Bidding strategy of virtual power plant for participating in energy and spinning reserve markets—Part I: Problem Formulation," IEEE Trans. on Power Systems, vol. 26, No. 2 (May 2011) pp. 949-956 (Year: 2011).*

Bhuvaneswari, R. et al., "Intelligent Agent Based Auction by Economic Generation Scheduling for Microgrid Operation," 2010 Innovative Smart Grid Technologies (2010) 6 pp. (Year: 2010).*

Oda, T. et al., "Immunity from spam: an analysis of an artificial immune system for junk email detection," Intl. Conf. on Artificial Immune Systems (2005) 14 pp. (Year: 2005).*

Logenthiran, T. et al., "Multi-agent system for energy resource scheduling of integrated microgrids in a distributed system," Electric Power Systems Research, vol. 81, (2011) pp. 123-148. (Year: 2011).*

"The Research on Bidding in Power Market Based on Immune Genetic Alogorithm and Particle Swarm Optimization Algorithm", CMFD,vol. Information technology , Tang Xin, chapter 1.2/4.2, Dec. 15, 2008, Changsha, Hunan, China.

"Research and Implementation of Immune-Based Co-Evolution Multi-Agent Model", CMFD, vol. Information technology, Dai Wei, chapter 3-4, Jul. 15, 2013, Changsha, Hunan, China.

"Research on Collaborative Evolution Model Based on Immune Multi-Agent", Computer Simulation, vol. 30-12 Wang Ruohui, pp. 380-384, Dec. 15, 2013, Taiyuan, Shanxi, China.

"An artificial immune system model for multi agents based resource discovery in distributed environments", First International Conference on Innovative Computing, Information and Control,vol. 1 Ki-Won Yeom, pp. 234-239, Sep. 1, 2006, Korea.

* cited by examiner

BIDDING METHOD OF DISTRIBUTED ENERGY RESOURCE IN MICRO-GRID BASED ON ARTIFICIAL IMMUNITY

FIELD OF THE INVENTION

The present invention belongs to the technical field of power system, and more particularly, relates to a bidding method of distributed energy resource in micro-grid based on artificial immunity.

BACKGROUND OF THE INVENTION

As an important organization of distributed energy resource (DER), the optimized operation of micro-grid is vital to utilization of this technology. Multi-Agent Systems (MAS) is suitable for resolving complicated and open distributed problems, thus occupies certain percentage in micro-grid operation and control utilizing[1].

Currently micro-grid optimized operation based on MAS structure mostly aims at the minimization of cost based on operation and maintenance of network equipment and mutual purchase of electric energy with primary network. The agents normally take voluntary cooperation and cooperate completely with each other to jointly finish the task in solving problems[2]. The existing operation mode has difficult in coordinating interest distribution inside the micro-grid especially when devices therein belong to different owners or when public micro-grid is involved. Current operation and control method of the micro-grid based on voluntary cooperation is subject to interest sharing conflict or difficulty in execution[3].

Power generation bidding method may well reflect the advantages of centralized and distributed control of the micro-grid, and has been practiced in market operation of large grid system [4]. In view of characteristics of distributed energy resources and micro-grid, the following problems should be overcome when adopts bidding in operation of the micro-grid:

(1) As little artificial intervention is imposed to the micro-grid, coordination mechanism between the distributed energy resources may be exploited during bidding process of the energy resource. Global optimized operation of the micro-grid is obtained by multiple feedbacks based on respective "reasonable" bidding under the economic principle of "for myself subjectively and for everybody objectively". During optimization, the actions of distributed energy resource's bidding results will be directly sent to the micro-grid operation and control agent to perform and therefore, bidding function should be incorporated into entire construction of the operation.

(2) Power generation bidding of the distributed energy resource inside the micro-grid is a complex system and is influenced by various factors such as environment. Distributed energy resources, such as wind energy and solar photo voltaic power generation, have the disadvantages of intermittence and uncontrollability. In addition to the complex operation environment which is difficult to control, it is hard to obtain bidding sample under all modes by means of actual observation or by means of analysis and simulation of actual system. Presently conventional power bidding algorithms such as "reinforcement learning" and "repeat game" are unable to achieve satisfying result of bidding under unknown environment. In the micro-grid, as bidding result will directly guide operation and control, seemingly "reasonable" bidding agent may seem to be "awkward" when facing unexpected events and this is unacceptable.

SUMMARY OF THE INVENTION

The present invention provides a micro-grid distributed energy resource bidding method based on artificial immunity. It can solve the existing problems such as conflict in interest distribution inside the micro-grid especially when devices therein belong to different owners or when public micro-grid is involved. The present method provides guidance to optimized operation of the micro-grid by market mechanism of bidding. The method is described as follows.

A micro-grid distributed energy resource bidding method based on the artificial immunity includes the following steps:

Process the collected information by a bidding unit agent to form the quotation environmental antigen of artificial immune;

Perform solving based on artificial immune algorithm to obtain the antibody meeting self-interests of a distributed energy resource; and Decode the antibody to obtain a bidding scheme of the distributed energy resource.

The steps of solving based on artificial immune algorithm to obtain antibody meeting self-interests of a distributed energy resource, and decoding the antibody to obtain a bidding scheme of the distributed energy resource may be divided into the following sub steps:

(1) Establish an antigen knowledge base based on typical characteristics of a bidding device and typical external environment;

(2) Initiate a gene base based on history bidding strategy of the bidding process;

(3) Identify the antigen and compare it with a typical antigen stored in the antigen knowledge base, if a matched antigen is found, then perform step (4), otherwise perform step (5);

(4) Perform a secondary artificial immunity response, take an antibody corresponding to the antigen in the antigen knowledge base as an antibody representative, and perform step (6);

(5) Perform a primary response to a mismatched antigen to achieve an antibody meeting affinity as an antibody representative, and store the matched antigen and antibody representative as a scene into the antigen knowledge base and then perform step (6); and (6) Decode the obtained antibody and submit the bidding result to a bidding management agent or other agent.

The step (5) of performing a primary response to a mismatched antigen to get an antibody meeting affinity as an antibody representative may be divided into the following sub steps:

(1) Select antibody genes from the gene base randomly to construct an initialized antibody collection, t=0;

(2) Calculate affinity of each antibody in the antibody collection upon the antigen of the bidding unit;

(3) Evolve allele in the artificial immune gene base based on the antibody affinity;

(4) Determine whether a termination condition is met, if yes, perform step (5), otherwise perform step (7);

(5) Perform immune evolution to the collection of the antibody to achieve a new antibody collection, and then perform step (6);

(6) Set t=t+1 and perform step (2);

(7) Take an antibody with the largest affinity in the antibody collection as an antibody representative, and perform step (8); and (8) Update the antigen knowledge base, take the antigen and obtained antibody representative as a scene and store them into the antigen knowledge base.

The termination condition includes:

(a) The obtained affinity is greater than an object function $\text{Affinity}_{set}$; or (b) The variation of affinity between two adjacent calculations is smaller than a threshold value ε; or (c) Operation of the algorithm exceeds certain generation number.

The calculation formula of the affinity is expressed as:

$$\text{Affinity}(Ab) = \begin{cases} \pi_i(b_i, c_i) + C_{min}, & \text{if } \pi_i(b_i, c_i) + C_{min} > 0 \\ 0, & \text{if } \pi_i(b_i, c_i) + C_{min} \leq 0 \end{cases}$$

Wherein, Affinity(Ab) is the affinity of antibody Ab; $C_{min}$ is an opposite value of fixed production cost for unit capacity of power generation of the distributed energy resource; and $\pi_i(b_i, c_i)$ is the interest of bidding unit based on artificial immune antibody and is obtained according to the following formula:

$$\max \pi_i(b_i, c_i) = Q_i \cdot P_{cl} - b_{0i} Q_i + \frac{1}{2} c_{0i} Q_i^2 - U_i C_{start}$$

Wherein, $P_{cl}$ is the electric clearance price between microgrid distributed energy resources and loads; $b_{0i}$ and $c_{0i}$ are variable cost coefficients of a unit set; $Q_i$ is the output of generator; $C_{start}$ is the start price of the unit set. For photovoltaic or wind power generators, $C_{start}=0$; and $U_i$ is a Boolean variable.

The present invention brings the following good effects.

(1) For the future development of electric power market and micro-grid, micro-grid may belong to different owners and it is unavoidable to perform optimized operation and control based on economic means such as bidding. The present invention can solve the problems such as conflict in interest distribution inside the micro-grid especially when devices therein belong to different owners or when public micro-grid is involved, thus being helpful to realize the commercialized operation of micro-grid.

(2) The present invention utilizes artificial immune intelligent algorithm with strong information processing ability and self-adaption, thus solving the problem of uncontrollable bidding under complicated environment. By employing the self-adaption and defect tolerance of the artificial immunity during bidding process, uncertainty problem resulted by the intermittent power supply can be overcomed. In addition, the coordination of MAS of entire micro-grid is improved by coordinated evolution of artificial immunity.

DETAILED DESCRIPTION OF THE INVENTION

To make better understand of the objects, solution and advantages of the invention, the present invention will be further described in detail combining with specific embodiments.

Artificial Immune system (AIS) establishes corresponding engineering model and algorithm by deeply exploring information processing mechanism underlying the biological immune system to solve kinds of complicated problems. From the perspective of information processing, immune system is a highly concurrent, distributed, self-adaptive and self-organized system, with strong ability of learning, recognition, memorization and feature retrieval. In recent years, it has demonstrated great information processing and self-adaptive capability in many engineering fields such as computer network safety, power system network reconstruction, study of autonomous robots, intelligent control, mode recognition, and malfunction detection, and is able to well solve dynamic problems of unknown environment.

Considering the problems listed in background art of the application, the present invention provides an optimized operation method of micro-grid distributed power bidding based on artificial immunity. By employing the artificial immunity during entire bidding during bidding process and utilizing the self-adaption and defect tolerance of artificial immunity, uncertainty problem resulted by the intermittent power supply can be solved, and the coordination of MAS of entire micro-grid is improved by coordinated evolution of artificial immunity. Reference is made to FIG. 1-10 and detailed description is provided below.

A. Flowchart of Distributed Energy Resource Bidding Method of a Micro-Grid Based on Artificial Immunity This function is realized by a bidding unit Agent, and it mainly includes following three steps:

(1) Process the collected information to form artificial immune quotation environmental antigen;

(2) Perform solving based on artificial immune algorithm to obtain antibody meeting interest of a distributed energy resource; and (3) Decode the antibody to obtain a bidding scheme of the distributed energy resource and submit it to the bidding management Agent.

Figure 1:
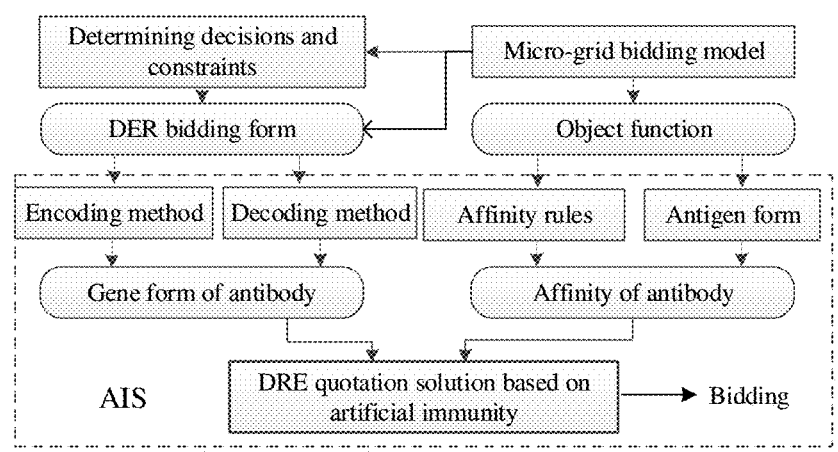
FIG. 1 shows a flowchart of optimization algorithm of micro-grid bidding method based on artificial immunity.

Wherein, a flowchart of an optimization algorithm of micro-grid bidding based on artificial immunity is shown in FIG. 1 in which determination of micro-grid bidding model, decision variable and restraint, DER bidding manner and object function are determined by market environment and bidding mode. The application of artificial immunity in bidding is denoted in boxes of the FIG. 1. At first, the antibodies are transformed into the expression capable of being handled by artificial immunity via encoding, and then the optimized transfer of antibodies occur randomly under inducement of affinity, and the obtained antibodies are decoded to form quotation finally.

Figure 2:
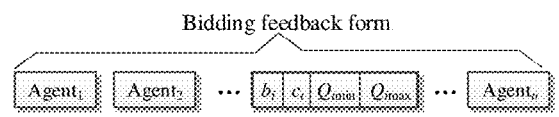
FIG. 2 shows a bidding feedback according to one embodiment of the present invention.

B. The Environmental Antigen Expression of Bidding Unit Agent for Artificial Immune Quotation Based on DER Device Characteristics The bidding environmental antigen model of respective DER bidding unit may include three parts: (a) environmental information of bidding device, this information being private information and varies for different device; for example micro-turbine cares for natural gas price, photovoltaic power generation cares for solar intensity in a time period, while wind turbine pays attention to wind intensity in a time period; (b) electric purchase price of the micro-grid when it is connected to a main network and electric sale price when sold to the main network during optimized operation period; (c) quotations of other bidding unit Agents including bidding coefficients $b_i$ and $c_i$ of the distributed energy resource, as well as minimum and maximum power capacity. The feedback of submitted quotations is shown in FIG. 2. This information can be obtained from the bidding management Agent, or by information interaction among the Agents. When only DERs are allowed to take part in bidding, the number n of the elements contained in the collection of antibody representatives is the number of the Agents corresponding to bidding DERs.

Wherein, environmental factors (antigen part 1) and technical parameters of respective bidding DERs determine the power generation cost and the periods $Q_{imin}$ and $Q_{imax}$; electricity market purchase and selling prices $P_{buy}$ and $P_{sell}$ (antigen part 2) determine upper and lower range of the clearance price $p_{cl}$ of the micro-grid, and the price of the bidding unit Agent and bidding feedback information (antigen part 3) determine value of clearance price $p_{cl}$ of the micro-grid, and this value is vital to bidding of the micro-grid and interest of respective participants within the micro-grid. Information interaction among the Agents is realized by submission in bidding and is published as bidding feedback to other bidding Agents.

C. Artificial Immunity Algorithm-Based Antibody, Encoding and Decoding of the Same are Determined by the Bidding Agent According to Quotation Manner of the Distributed Energy Resource Instead of direct operating the actual decision variable (that is the quotation of power generation) of the problem to be solved, operation of the artificial immunity algorithm realizes optimization via performing calculation such as clone, variation and selection to solvable individual code. Quotation form of the bidding DER contains four parameters $[b_i, c_i, Q_{imin}, Q_{imax}]$, wherein $Q_{imin}$ and $Q_{imax}$ are concerned with environment and technical factors of related period, and these two parameters take no part in bidding strategy. As a result, the antibody as described herein only includes genetic elements $b_i$ and $c_i$, and encoding of the antibody is also conducted to genetic elements $b_i$ and $c_i$. The antibody encoding in the embodiments employs Gray coding, the main advantage of which is that the change between adjacent points follows to minimum character set coding principle, thus improving the local search ability of AIS method.

Two decision variables $b_i$ and $c_i$ are expressed by a string of binary encoding of l bits. If adopting a 10 bits binary string for representing 1024 different numbers ranging from 0 to 1023, decision variables $b_i$ and $c_i$ are discretized to 1023 equal regions, which correspond to binary codes between 0000000000 (0) and 1111111111(1023). Then two strings of binary codes of $b_i$ and $c_i$ are connected together to constitute a string of binary codes of 20 bits, which is the antibody encoding of the optimization function and is a one-to-one correspondence between solution space and search space of artificial immunity. Conversion between decimal and binary may be made with reference to known techniques and the present invention makes no limitation to this.

Figure 3:
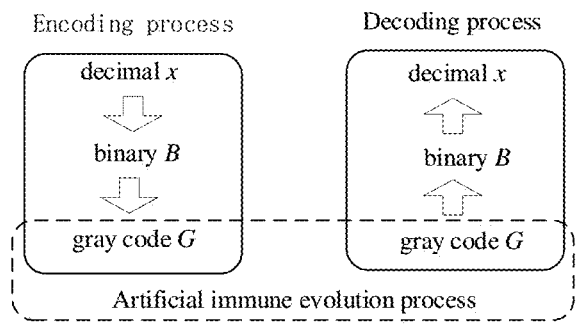
FIG. 3 shows encoding and decoding process of an antibody.

Encoding and decoding of the antibody in the embodiments may be conducted by decimal-binary-Gray code conversion and details are shown in FIG. 3.

Under assumption that upper and lower limits of decision range of $x_i$ (representing genetic fact of $b_i$ or $c_i$) is $U_{imax}$ and $U_{imin}$, encoding precision is:

$$\delta = \frac{U_{imax} - U_{imin}}{2^l - 1} \qquad (1)$$

If binary individual codes of l bits are $b_l b_{l-1} b_{l-2} \ldots b_2 b_1$ then the corresponding decimal decoding formula may be presented as:

$$x_i = U_{imin} + \left( \sum_{i=1}^{l} b_i \cdot 2^{i-1} \right) \frac{U_{imax} - U_{imin}}{2^l - 1} \qquad (2)$$

If binary code is $B = b_m b_{m-1} b_{m-2} \ldots b_2 b_1$, then corresponding Gray code is $G = g_m g_{m1} g_{m2} \ldots g_2 g_1$. Conversion formula of converting binary to Gray code may be expressed as:

$$\begin{cases} g_m = b_m \\ g_i = b_{i+1} \oplus b_i \quad i = m-1, m-2, \ldots, 1 \end{cases} \qquad (3)$$

Conversion formula of converting Gray code to binary can be expressed as:

$$\begin{cases} g_m = b_m \\ b_i = b_{i+1} \oplus g_i \quad i = m-1, m-2, \ldots, 1 \end{cases} \qquad (4)$$

Wherein, $\oplus$ represents XOR operator.

Figure 4:
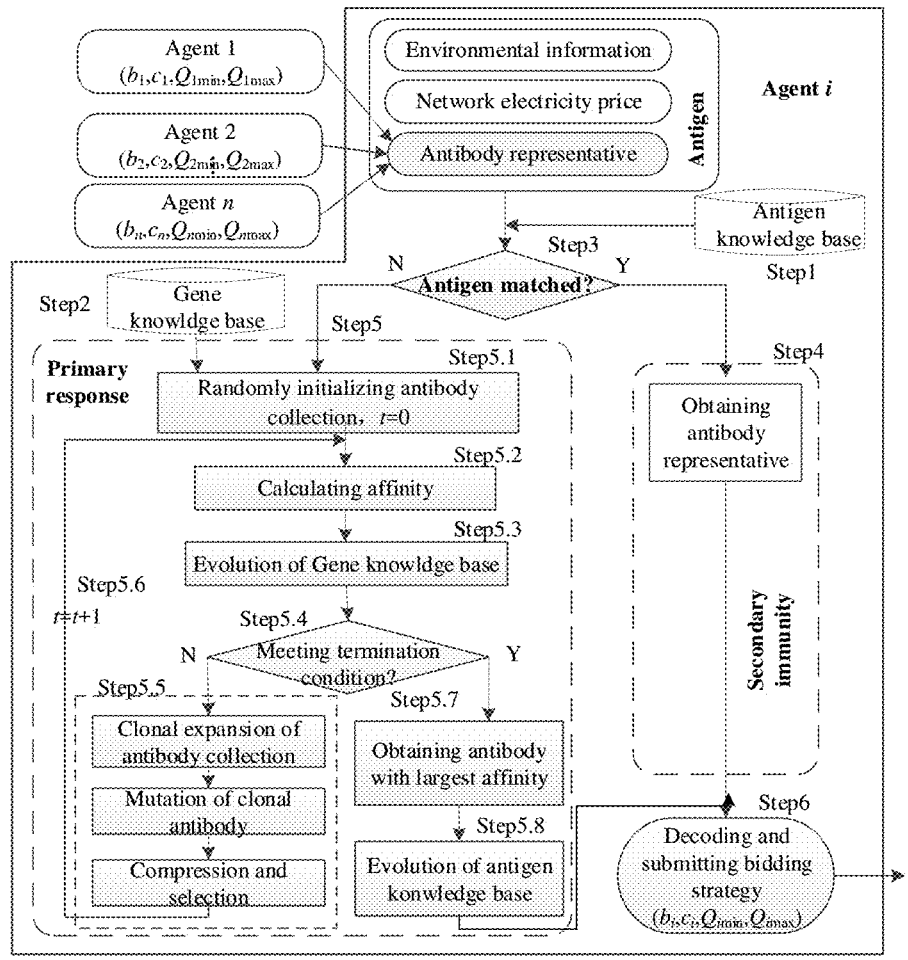
FIG. 4 shows a solving flow chart of bidding performed by a unit bidding agent based on artificial immunity of the present invention.

D. Based on Quotation Environmental Antigen, the Unit Bidding Agent Performs Calculation by Artificial Immune Algorithm to Achieve Antibody Consistent with Self-Interest of the Distributed Energy Resource, and Decodes the Antibody to Obtain Bidding Scheme Wherein, each bidding process is an immunization process. For micro-grid distributed energy resource bidding algorithm based on artificial immunity, the keypoint of this technique is self-adaptive immune algorithm of a single Agent and the coordinated evolution of respective Agents realized on this basis. Bidding solving process of unit bidding Agent realized by artificial immune method is depicted in FIG. 4 and includes the following steps.

401: Establish an antigen knowledge base based on typical characteristics of DER device and typical external environment. This step is executed only for the first operation.

Wherein, the antigen knowledge base is accumulation of history knowledge of bidding unit Agent itself. The antigen knowledge base comprises typical antigens and corresponding "mature" antibodies. Source of information includes environmental monitoring data (such as power generation forecasting, fuel cost and the like), main network electricity purchase and sale price information provided by the micro-grid management Agent, quotation information provided from other Agents, technical parameters of the power generation device itself, and history bidding information, etc. Whereas, the load will generate some typical bidding schemes according to experienced knowledge such as date property (week, vacation or not) and external environment (weather and temperature) and store them into the antigen knowledge bases.

402: Initialize the gene knowledge base based on DER history bidding strategy, which is executed only for the first operation.

Wherein, gene knowledge base and evolution of the same play important role in the entire evolution process. Using customized operation of the knowledge base element, new antibody which is more matching the antigen may be positively generated with purposiveness.

Initialization of gene knowledge base is obtained by the gene of "mature" antibody in the antigen knowledge base. According to the type of DER and technique-economy property, series of quotation parameters may be formed. For example, distributed energy resource devices such as wind or photovoltaic may offer typical bidding parameters based on different weather report, and micro-turbine may provide typical bidding parameters based on price of natural gas. Gene knowledge base is able to provide guide to the update of antibody.

403: Identify the antigen of the certain period and compare it with typical antigen stored in the antigen knowledge base. If the matched antigen is found, then go to step 404, otherwise go to step 405.

Wherein, as in each period, the antigen of bidding DER includes relatively static grid electricity price and environmental factors, and as bidding (bidding feedback) of respective bidding units of the micro-grid has highly repetition, a great amount of optimal solutions will find similar scene according to experienced history knowledge. The step of match adopts general database search function and the keyword is antigen.

404: Take an antibody corresponding to the antigen in the antigen knowledge base as an antibody representative, and perform decoding to obtain the bidding result. This process is a secondary response, then perform step 406.

405: Perform a primary response to the mismatched antigen to obtain an antibody meeting affinity as an antibody representative, and then perform step 406.

Decode the obtained antibody representative and submit the bidding strategy in the form of [$b_i$, $c_i$, $Q_{imin}$, $Q_{imax}$] to a bidding management agent or other agent.

406: Update the antigen knowledge base, take the antigen and obtained antibody representative as a scene and store them into the antigen knowledge base. Wherein, storing the newly occurred antigen and corresponding "mature" antibody in the antigen knowledge base is a continuous accumulation process.

E. For Step 405, Performing of a Primary Response to a Mismatched Antigen by Using Artificial Immune Algorithm, Which may be Divided into the Following Sub Steps:

4051: Initialize the antibody collection

Antibody genes are randomly selected from the gene knowledge base to form "immature" antibody collection.

According to the coding of the embodiment, the bidding unit strategy includes two alleles $b_i$ and $c_i$, and therefore, alleles may be selected from the gene knowledge base to construct candidate solution and accordingly form an antibody collection (i.e., the bidding strategy). The number of the antibody contained in the antibody collection is m, and may be within a range from 5 to 20. Increasing of m may increase the quality of the "mature" antibody to be obtained, however this will also increase calculation amount in the calculation process.

4052: Calculate affinity of antibody in the "immature" antibody collection

Define affinity of the antibody and antigen as follows:

$$\text{Affinity}(Ab) = \begin{cases} \pi_i(b_i, c_i) + C_{min}, & \text{if } \pi_i(b_i, c_i) + C_{min} > 0 \\ 0, & \text{if } \pi_i(b_i, c_i) + C_{min} \leq 0 \end{cases} \quad (5)$$

Wherein, $\pi_i(b_i, c_i)$ is interest of the bidding unit based on bidding coefficients ($b_i$, $c_i$). In certain environment (antigen), when the bidding strategy (antibody) is able to obtain the maximum interest (object function), it is considered to achieve the largest affinity. $C_{min}$ is suitable to be a small number as an opposite value of fixed production cost for unit power generation of the distributed energy resource.

The affinity of antibody is calculated by formula (5), wherein the object function $\pi_i(b_i, c_i)$ of the distributed energy resource bidding may be obtained by the following formula:

$$\max \pi_i(b_i, c_i) = Q_i \cdot P_{cl} - b_{0i} Q_i - \tfrac{1}{2} c_{0i} Q_i^2 - U_i C_{start} \quad (6)$$

Wherein, $P_{cl}$ is electricity clearance price between the distributed energy resource and load in the micro-grid, and is determined by quotation of respective unit sets and load. $b_{0i}$ and $c_{0i}$ are variable cost coefficients of a unit set, the number of which may be very small or even are zero; $Q_i$ is output of the generator, and it requires to meet the condition of $Q_{imin} \leq Q_i \leq Q_{imax}$; $C_{start}$ is the start price of the unit set, for photovoltaic or wind power generation, $C_{start}=0$; and $U_i$ is a Boolean variable. When the system switches from off state to running state, $U_i=1$; and in other cases, $U_i=0$.

Wherein, the values of $P_{cl}$ and $Q_i$ in formula (6) may be obtained by following process but is not limited thereto:

(1) Form a general load demand curve by taking quotation curves of all loads during the bidding period. A supply curve is generated for each unit set according to quotation ($b_j$ and $c_j$, j≠i), set k=0.

(2) For each DER, quotation curve is formed based on formula (7). Assume potential upper and lower limits of the clearance price in the micro-grid are $\lambda_{up}$ and $\lambda_{down}$ and assume $\lambda_{up}=P_{buy}$ and $\lambda_{down}=P_{sell}$, wherein $P_{buy}$ and $P_{sell}$ are electricity purchase price for the micro-grid when it is connected to a main network and electricity sale price when sold to the main network respectively.

$$B_i(Q_i) = b_i + c_i Q_i \quad (7)$$

(3) According to supply curve of each DER, the value of maximum power generation amount $Q_{i,up}$ and minimum amount $Q_{i,down}$ of each DER are obtained, and power generation amount $\Delta Q_{up}$ and $\Delta Q_{down}$ are also obtained for the micro-grid when the clearance prices are $\lambda_{up}$ and $\lambda_{down}$. For the $i^{th}$ DER, power generation amount $Q_{i,up}$ corresponding to $\lambda_{up}$ is obtained based on its supply curve. If $Q_{i,up} > Q_{i,max}$, then $Q_{i,up}=Q_{i,max}$. In the same way, according to supply curve of the unit set and based on power generation $Q_{i,down}$ corresponding to $\lambda_{down}$, if $Q_{i,down} < Q_{i,min}$, then $Q_{i,down}=Q_{i,min}$.

Power generation amount $\Delta Q_{up}$ and $\Delta Q_{down}$ are obtained according to formula (8) when the clearance prices in the micro-grid are $\lambda_{up}$ and $\lambda_{down}$.

$$\begin{cases} \Delta Q_{up} = \sum_{i=1}^{n} Q_{i,up} - D(\lambda_{up}) \\ \Delta Q_{down} = \sum_{i=1}^{n} Q_{i,down} - D(\lambda_{down}) \end{cases} \quad (8)$$

(4) Set k=1, and if $\Delta Q_{up}$<0, it means that power generation of all DERs fails to meet requirement of loads and therefore, take $\lambda^k=\lambda_{up}$, and perform step (8); if $\Delta Q_{down}$>0, it means that even each DER adopts minimum power generation amount, and it still exceeds requirements of load, then take $\lambda^k=\lambda_{down}$, and turn to step (8); if $\Delta Q_{up} \geq 0$ and $\Delta Q_{down} \leq 0$, then new clearance price $\lambda^k$ of the micro-grid is calculated according to formula (9), and then perform step (5).

$$\lambda^k = \frac{\lambda_{up} - \lambda_{down}}{\Delta Q_{up} - \Delta Q_{down}} \Delta Q_{down} + \lambda_{down} \quad (9)$$

(5) Set k=k+1, corresponding $Q_i$ is obtained based on obtained $\lambda^k$ and according to supply curve of each unit set. If $Q_i$ exceeds the limit, then the value is obtained according to the limit, and $\Delta Q^k$ is obtained in accordance with formula (10).

$$\Delta Q^k = \sum_{i=1}^{n} Q_i - D(\lambda^k) \quad (10)$$

(6) If $\Delta Q^k$>0, set $\lambda_{up}=\lambda^k$ and $\Delta Q_{up}=\Delta Q^k$, and interpolate $\Delta Q^k$ into power output value $\Delta Q_{down}$ corresponding to $\lambda_{down}$ and based on formula (9), thus obtaining a new micro-grid clearance price $\lambda^k$. If $\Delta Q^k$<0, set $\lambda_{down}=\Delta Q^k$ and $\Delta Q^k$ and interpolate $\Delta Q^k$ into $\lambda_{up}$ based on formula (9), thus obtaining a new micro-grid clearance price $\lambda^k$.

(7) Convergence judgment. If $|\lambda^k-\lambda^{k-1}| \leq \varepsilon_\lambda$, set $\lambda^k=(\lambda^k-\lambda^{k-1})/2$, then go to step (8); otherwise turn to step (5). Wherein, $\varepsilon_\lambda$ is predefined operation tolerance of micro-grid clearance price, the value is a positive decimal fraction and the typical value is of RMB0.01.

(8) Record $\lambda^k$ as micro-grid clearance price $P_{cl}$, and calculate the power generation amount $Q_i$ of the distributed energy resource based on the clearance price.

Interest $\pi_i(b_i, c_i)$ of the bidding unit/is obtained based on $P_{cl}$ and $Q_i$.

4053: Evolve the allele of artificial immune gene knowledge base based on the calculated affinity results of the antibody in antibody collection.

Wherein, evolution of gene knowledge base is a learning process. Antibody with affinity higher than average antibody affinity $avg_{Affinity}$ is called "mature" antibody. During each evolution of gene knowledge base, all gene concentration attenuates with speed $\rho$ and at the same time, gene constructed of mature antibody provide positive feedback to corresponding allele inside the gene knowledge base, while all allele corresponding to "immature" antibody only attenuates without enhancement, thus resulting in negative feedback effect.

For collection of the antibody containing m antibodies, average antibody affinity $avg_{Affinity}$ is calculated by following formula.

$$avg_{Affinity} = \frac{\sum_{i=1}^{m} \text{Affinity}(Ab_i)}{m}, Ab_i \in A(t) \quad (11)$$

Wherein, $A(t)=\{Ab_1, Ab_2, \ldots, Ab_i, \ldots, Ab_m\}$ in the antibody collection.

Assume $c(x_i)$ represents gene concentration of the gene knowledge base ($x_i$ represents genetic element $b_i$ or $c_i$), $\Delta c(X_i)$ means change of gene concentration. Concentration change of each allele of the gene knowledge base is obtained according to formula (12).

$$c(x) \leftarrow \rho \cdot c(x_i) + (1-\rho) \cdot \Delta c(x_i) \quad (12)$$

$$\Delta c(x_i) = \begin{cases} \frac{\text{Affinity}(Ab_{oki})}{avg_{Affinity}} & \text{if } x_1 \in Ab_{oki} \\ 0 & \text{otherwise} \end{cases}$$

Wherein, $Ab_{oki}$ is the mature antibody, while $\rho$ is attenuation speed of gene concentration, and the typical value could be of 0.8.

While other parameters remain unchanged, too small $\rho$ will cause the concentration change of gene knowledge base being easily affected by mature antibody during last iteration. As a long term memory mechanism, the gene knowledge base will lose some useful history information due to excessive updates, thus resulting in decrease in quality of solution and increase in total operation time. However, if the value of $\rho$ is too large, evolution of the gene knowledge base will become slow, thus increasing total operation time for obtaining the satisfying antibody. In particular, if the value of $\rho$ is 1, no evolution will happen to the gene knowledge base (in other words, gene concentration will be kept unchanged). As a result, directional evolution mechanism of antibody in the algorithm will be deteriorated seriously. This can be seen from receptor editing model change in step 40552.

4054: Determine whether a termination condition is met based on the result of step 4052, and perform step 4055 if the termination condition is not met, otherwise perform step 4057.

Wherein, the algorithm defines three termination requirements, and it will terminate once one of these requirements is met. These requirements include: (a) meeting conditions of object function set by the bidding unit Agent (that is to say, the affinity is greater than the object function Affinity$_{set}$, which is a positive value set by the distributed energy resource); (b) the algorithm performing continuously multiple iteration, and the maximum affinity will not appear to add up (namely, affinity change between two adjacent calculations is smaller than a threshold value $\varepsilon$ which is a small positive value); and (c) operation times of the algorithm exceeds certain times.

Wherein, the bidding solving process of artificial immunity described above may be done at any time. It can quickly generate a better solution, and then the quality of the solution can be improved after several repetitions. In addition, the bidding process can be interrupted at any time and output the solution with certain quality. During operation, by weighing quality and calculation time of the solution, sub-optimal solution may be obtained when cost of calculation cannot be neglected. Moreover, as clone selection process of antibody are based on probability, the algorithm cannot ensure to obtain a collection of global optimal solutions. To some extent, the bidding solving process of the present invention achieves high efficiency of calculation by loss of completeness. As such, to guarantee quality of solutions and to improve efficiency of bidding unit Agent, the maximum operation times of the algorithm may range from 20 to 100.

4055: Antibody collection evolves under stimulation of antigen to perform immunity evolution for forming a new antibody collection.

Note: immunity evolution of the antibody collection indeed happens in one generation around candidate solutions to generate mutation solution collection based on magnitude of affinity. Thereby the searching range is enlarged, and antibody collection is compressed to its initial size by optimal selection. In a period from t to t+1, the antibody group A(t) undergoes antibody immune cloning, antibody mutation and compression of antibody collection to select new collection group A(t+1).

4056: Set t=t+1 and go to step 4052.

4057: Obtain antibody with the largest affinity as the antibody representative from the antibody collection, then perform step 4058.

4058: Update the antigen knowledge base, and take the antigen and obtained antibody representative as a scene and store them into the antigen knowledge base.

F. During Operating the Step 4055, Immune Evolution of the Antibody Collection of the Algorithm Includes Clonal Expansion of Antibody Collection, Mutation of Clonal Antibody, and Compression of Antibody Collection. The Details are Described Below.

40551: Clonal expansion of antibody collection. According to the affinity, the antibody of the antibody group A(t) is cloned to form a antibody group Λ'(t).

Before clone, the antibody group is: A(t)={Ab$_1$, Ab$_2$, ..., Ab$_i$, ..., Ab$_m$}

After clone, the antibody group is: A'(t)={A$_1$', A$_2$', ..., A$_m$'}, wherein A$_i$'={Ab$_{i1}$, Ab$_{i2}$, ..., Ab$_{iq_i}$} is an antibody collection after performing $q_i$ times of clone to antibody Ab$_i$, and the element of A$_i$', Ab$_{ij}$=Ab$_i$, 1, 2, ..., q$_i$.

In this embodiment, the number of clone of any antibody Ab$_i$ inside the antibody collection is adjusted self-adaptively, and is determined by the following formula:

$$q_i = \text{Int}\left(m \cdot Size_{Clone} \cdot \frac{\text{Affinity}(Ab_i)}{\sum_{i=1}^{m} \text{Affinity}(Ab_i)}\right) \quad (13)$$

Wherein, $q_i$ is clonal scale of antibody Ab$_i$, which is proportional to value of affinity of antibody. Antibody with higher affinity will bring larger number of $q_i$, and will strengthen the local search probability. Int(·) is top integral function; Affinity(Ab$_i$) is affinity of antibody Ab$_i$; and m is scale of the antibody collection. $Size_{Clone}$ is a predefined value associated with scale of clone, which has impact on total clonal scale and constraints of limited resource, the typical value of $Size_{Clone}$ may range from 5 to 30. In case other parameters are kept constant, increase of $Size_{Clone}$ will bring improvement of solution quality and slightly increase of total operation time. This is because increase of $Size_{Clone}$ results in increase of total number of mutation when performing iteration each time, and increases the possibility of finding out better candidate solution during each iteration, also increases the quality of solution accordingly. Meanwhile, for total operation time, increase of $Size_{Clone}$ will increase scale of antibody, mutation times and costs of operation of mutation.

40552: Mutation of clonal antibody. Mutate the clonal antibody of A'(t) based on probability to obtain the mutated antibody group A"(t)={A"$_1$, A"$_2$, ..., A"$_m$}, wherein A"$_i$={Ab$_{i1}$', Ab$_{i2}$', ..., Ab$_{iq_i}$'} the collection after the elements of antibody collection A$_i$' mutated. The A"$_i$ element Ab$_{ij}$', (j=1, 2, ..., q$_i$) of is mutation antibody of element Ab$_{ij}$ of collection A$_i$'.

The mutation process of this embodiment utilizes somatic hyper mutation model and receptor editing model. For any antibody Ab$_{ij}$→Ab$_{ij}$' the following steps are employed:

(1) Set the threshold value P of mutation mode, and the value may be a decimal fraction ranges in [0,1], for example 5%~10%.

(2) Obtain a random value P$_{random}$ between [0,1].

(3) If P$_{random}$>P, then antibody mutation is done with somatic hypermutation model; if P$_{random}$<=P, then receptor editing model is used to perform mutation.

(4) Replace cloned antibody with mutation antibody.

To maintain original property of antibody, elements of an initial antibody groupA(t) will not be mutated. During process from A'(t) to A"(t), scale of antibody group is kept unchanged. Practice of somatic hypermutation model and receptor editing model has the features of: (a) for somatic hypermutation model: realization of local search of adjacent domain where the antibody locates by partial mutation of the same antibody. Amplitude of mutation is in inverse proportion to the affinity of antibody. For antibody with higher affinity, accurate search may be conducted in its smaller adjacent domain; (b) for receptor editing model: the embodiment adopts ratio selection (roulette wheel selection) method, genetic segment is selected from the gene knowledge base according to concentration of the gene to form a new antibody. During mutation, gene with high concentration is more likely to be selected.

Figure 5:
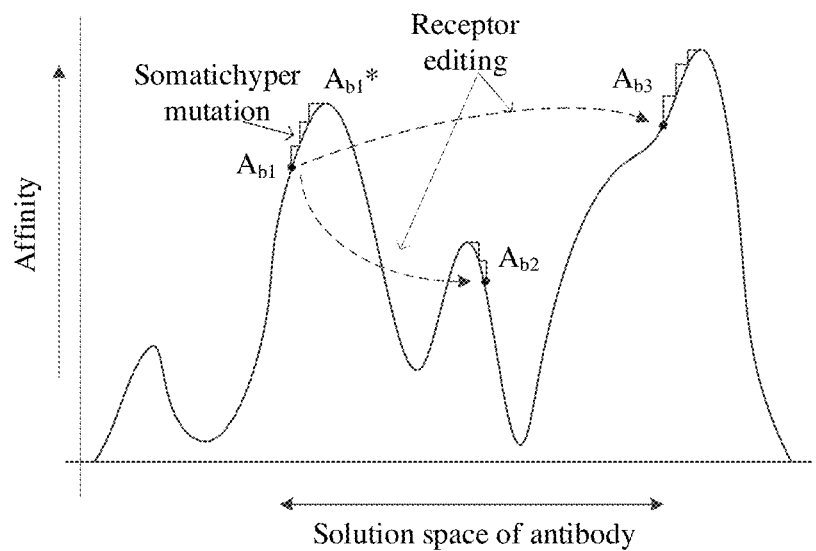
FIG. 5 shows a schematic view illustrating solution space change of antibody affinity during clone and mutation according to the embodiment of the invention.

In the algorithm, the process of clonal selection is an effective mechanism for combining local search and global search. Change of solution space of affinity during clonal mutation of antibody is shown in FIG. 5. Somatic hypermutation can gradually increase antibody affinity to locally optimum, while receptor editing is able to jump out of current region to generate a new antibody, thus preventing premature of evolution and search in local limit value.

40553: the compression and selection of antibody collection. Calculate affinity of antibody element of mutated antibody group A"(t), and select m antibodies with highest affinity to form a new generation of antibody groupA(t+1).

Wherein, the entire process is that: converting the problems located in a low dimensional space (n dimension) to a high dimensional space (N dimension) and searching to solve it, and finally projecting the results into a low dimensional space (n dimension).

Embodiment of Calculation and Analysis

Figure 6:
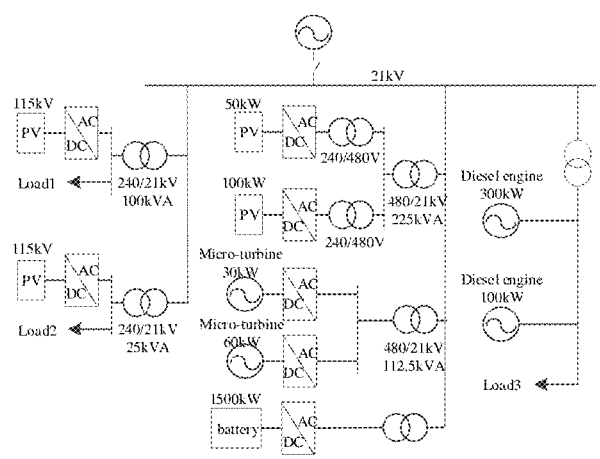
FIG. 6 shows the structure of a micro-grid according to one embodiment of the invention.

Example will be given to a commercial micro-grid project which as the system structure as shown in FIG. 6. This micro-grid includes three feeding lines, and different types of distributed energy resources such as 2 micro-turbines, 2 diesel engines and 4 solar photovoltaic energy. Reactive portion is not taken into account. The cost factors and Upper and lower limits of power output of each distributed energy resource are exhibited in table 1.

TABLE 1

DER cost factors and power output limits

| number | type | Operation cost $/kW | Minimum electricity generation amount/kW | Maximum electricity generation amount/kW | Starting fees/$ |
|---|---|---|---|---|---|
| 1 | Photovoltaic 1 | 0 | 0 | 115 | 0 |
| 2 | Photovoltaic 2 | 0 | 0 | 115 | 0 |
| 3 | Photovoltaic 3 | 0 | 0 | 50 | 0 |
| 4 | Photovoltaic 4 | 0 | 0 | 100 | 0 |
| 5 | Micro-turbine 1 | 0.02 | 5 | 30 | 2 |
| 6 | Micro-turbine 2 | 0.025 | 10 | 60 | 2 |
| 7 | diesel engine 1 | 0.035 | 90 | 300 | 1 |
| 8 | diesel engine 2 | 0.035 | 60 | 100 | 1 |

Assume at a certain peak time, the micro-grid purchases at price of 0.022 $/kWh from the main network and sells at price of 0.03 $/kWh. As the time of each duration is constant (such as 15 min), it is available to replace the electricity amount with power of the micro-grid, the active power demand of three loads in this period is 130 kW, and reactive power requirement and influence of the same will not be taken into account. Default values of major operation parameters of the algorithm are: scale of antibody collection=8, clonal scale of antibody size$_{clone}$=4, threshold value of mutation mode P=0.1, maximum permissible bidding times max$_{bid}$=5, and maximum permissible generations of antibody evolution Max$_{Gen}$=50.

Figure 7:
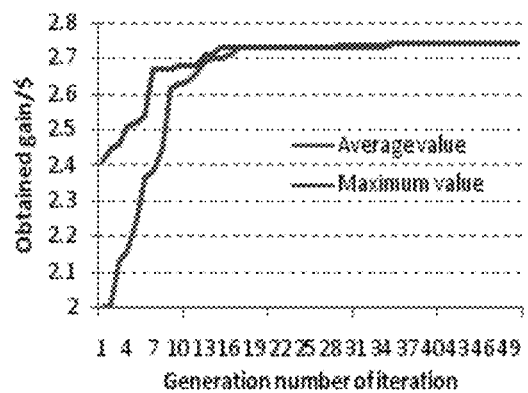
FIG. 7 illustrates the variation trend of affinity of antibody collection during bidding process of an agent according to one embodiment of the invention.

Affinity change of an antibody collection during bidding process of some Agent is illustrated in FIG. 7. In which, the horizontal axis represents evolution iteration generations of the antibody, while vertical axis represents gain (affinity) obtained by DER. Two lines shown in FIG. 7 represent the maximum and average affinity of antibody collection. It is seen from the figure that for each Agent, though antibody (bidding strategy) has affected by affinity of antigen (environmental factor and other collection of antibody representative), there exists increased tendency.

Figure 8:
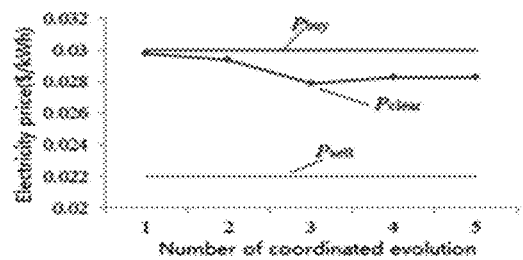
FIG. 8 shows the clearance price of the micro-grid over a bidding duration after several times of coordination in the micro-grid according to one embodiment of the invention.

By the submission of antibody representative, coordinated evolution of respective bidding units Agents inside the micro-grid is realized. As bidding is done based on private information of respective part, this may also be done based on quotation of other agent. As such, bidding price will rapidly converge and then reach Nash Equilibrium. Convergence of bidding price inside the micro-grid is shown in FIG. 8.

After performing electricity generation adjustment of the Agent bidding strategy, the Agent of the micro-grid is able to realize minimization cost of electricity generation and power transmission of the micro-grid while keeping maximum efficiency of photovoltaic and wind generation. The bidding result is shown in table 2.

TABLE 2 micro-grid DER operation results based on bidding

| number | type | Clearance price $/kW | electricity generation amount kW | Obtained gain $ |
|---|---|---|---|---|
| 1 | Photovoltaic 1 | 0.028 | 115 | 3.22 |
| 2 | Photovoltaic 2 | | 115 | 3.22 |
| 3 | Photovoltaic 3 | | 50 | 1.4 |
| 4 | Photovoltaic 4 | | 100 | 2.8 |
| 5 | Micro-turbine 1 | | 30 | 0.24 |
| 6 | Micro-turbine 2 | | 10 | 0.03 |

TABLE 2-continued micro-grid DER operation results based on bidding

| number | type | Clearance price $/kW | electricity generation amount kW | Obtained gain $ |
|---|---|---|---|---|
| 7 | diesel engine 1 | | 0 | 0 |
| 8 | diesel engine 2 | | 0 | 0 |

Note:
the obtained gain only includes gain of electricity energy, and gain of supplying heating and cooling has been deducted from DER quotation.

Figure 9:
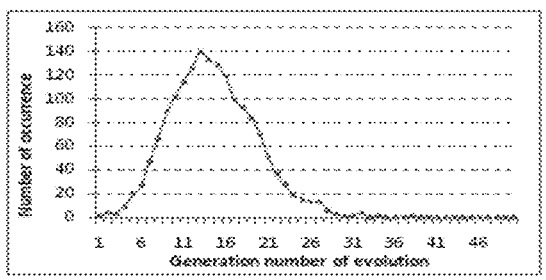
FIG. 9 shows an evolved generation distribution of the bidding unit agent after solving for 5000 times.

Artificial immune algorithm is a random algorithm, and operation period of system may be different each time. The present invention makes statistical analysis on expected generation of optimal solution to be obtained by a single Agent. The system has run bidding operation for 5000 times to the micro-turbine Agent and the statistical results of self-adaptive scheme are shown in FIG. 9, wherein the horizontal axis represents number of evolution generation, whereas the vertical axis means the times (frequency) by which global optimal solution corresponding to the number of evolution generation can be found out. Seen from the figure, there is high probability within 30 generations to find out the global optimal solution, and the average generation to find out the optimal solution is 13.5 generations.

Figure 10:
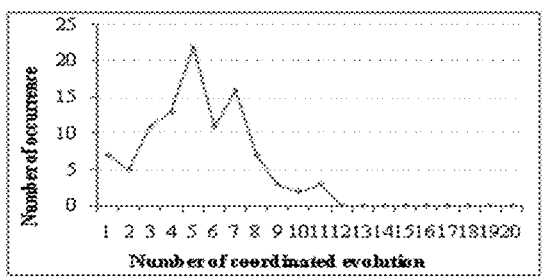
FIG. 10 shows the distribution of coordinated evolution times after micro-grid's solving for 100 times to achieve a Nash Equilibrium.

For the entire micro-grid, Nash Equilibrium will be reached after several times of coordinated evolution. FIG. 10 shows optimal result after solving on the micro-grid for 100 times of coordinated evolution. As seen from figure that the maximum expectation number is 5 by which Nash Equilibrium price can be obtained based on bidding. To save operation time, feedback and coordination times may be limited to less frequency so as to finish bidding inside the micro-grid.

The present invention runs on the basis of antibody gene knowledge base, thus guarantees quick convergence and global optimization of artificial immunity bidding scheme. The bidding process is a continuous repeating process, and abnormal accidents are far less than normal accidents during actual operation. The new antibody generated during a primary response has memory and when similar questions rise again, the optimal bidding scheme will be generated quickly by using a secondary response mechanism. In addition, respective Agents run calculation concurrently and therefore render higher efficiency.

REFERENCES

[1] WangChengshan, Wu Zhen, Li Peng. Research on Key Technologies of Micro-grid [J]. 2014, 29(2):1-12.
[2] Logenthiran T, Srinivasan D, Khambadkone A M, et al. Multi-agent System for Real-Time Operation of a Micro-grid in Real-Time Digital Simulator [J]. IEEE Transactions on Smart Grid, 2012, 3(2):925-933.
[3] Bhuvaneswari R, Srivastava S K, Edrington C S. et al. Intelligent agent based auction by economic generation scheduling for microgrid operation [C], Innovative Smart Grid Technologies (ISGT), 2010:1-6.
[4] Praca I, Morais H, Ramos C, et al. Multi-agent electricity market simulation with dynamic strategies & virtual power producers [C]. IEEE Power and Energy Society General Meeting—Conversion and Delivery of Electrical Energy, July 2008:1-8.

Person skilled inthe art would have understood that the accompanied drawings are only for illustrative purposes of a preferred embodiment of the invention. The above inventive embodiments are for descriptive purposes and not reflect advantages or disadvantages of the embodiments.

Though various embodiments of the invention have been illustrated above, a person of ordinary skill in the art will understand that, variations and improvements made upon the illustrative embodiments fall within the scope of the invention, and the scope of the invention is only limited by the accompanying claims and their equivalents.

What is claimed is:

1. A bidding method for a distributed energy resource participating in a micro-grid, said method, based on artificial immunity, comprising steps:
    1. collecting information by a bidding unit agent for the distributed energy resource to form an environmental antigen for an artificial immune system based on three parts of information: (a) environmental information of the bidding unit, (b) electric purchase prices and sale prices of the micro-grid in a particular period, and (c) quotations of other bidding units participating in the micro-grid;
    2. calculating using an artificial immune algorithm to obtain an antibody that satisfies a preset interest by the distributed energy resource; and
    3. decoding the antibody to obtain a bidding scheme for the distributed energy resource;
    wherein steps 2 and 3 are performed in steps as follows:
    (a) establishing an antigen knowledge base based on typical characteristics of devices and typical bidding environments;
    (b) initiating a gene base from historical bidding schemes
    (c) identifying the antigen from step 1 and comparing it with those stored in the antigen knowledge base, and if a matched antigen is found, then performing step (d), otherwise performing step (e);
    (d) performing a secondary artificial immunity response to obtain an antibody, and taking the antibody to perform step (f);
    (e) performing a primary response to a mismatched antigen to achieve an antibody meeting an preset affinity as an antibody representative, and then taking the antibody to perform step (f); and
    (f) decoding the obtained antibody to result in a bidding scheme and submitting the bidding scheme to a bidding management agent or other agent;
    wherein step (e) comprises steps as follows:
    (i) selecting an antibody gene from the gene base randomly to construct an initialized antibody collection, with t=0, where t is a serial number for a generation of the antibody collection;
    (ii) calculating affinity of each antibody in the antibody collection towards the antigen;
    (iii) evolving allele in the gene base based on the affinity calculated in step (ii);
    (iv) determining whether a predefined condition is met and if the predefined condition is met, performing step (v), otherwise performing step (vii);
    (v) performing immune evolution to the antibody collection to achieve a new antibody collection, and then perform step (vi);
    (vi) setting t=t+1 and performing step (ii) with the new antibody collection;
    (vii) taking an antibody with largest affinity in the antibody collection as an antibody representative to perform step (f), and to perform step (viii); and
    (viii) updating the antigen knowledge base by taking the antigen and obtained antibody representative as a scene and store the scene into the antigen knowledge base;
    wherein the predefined condition comprises:
    (a) the obtained affinity in step (ii) is greater than an object function $\text{Affinity}_{set}$; or
    (b) a variation of affinity between two adjacent calculations is smaller than a threshold value $\varepsilon$; or
    (c) operation of the artificial immune algorithm exceeds a preset number of generations;
    wherein the affinity is calculated using a formula as follows:

$$\text{Affinity}(Ab) = \begin{cases} \pi_i(b_i, c_i) + C_{min}, & \text{if } \pi_i(b_i, c_i) + C_{min} > 0 \\ 0, & \text{if } \pi_i(b_i, c_i) + C_{min} \le 0 \end{cases}$$

wherein, Affinity (Ab) is antibody Ab's affinity; $C_{min}$ is an opposite value of fixed unit production cost at the distributed energy resource; and $\pi_i(b_i, c_i)$ is interest of the distributed energy resource based on artificial immune antibody, $b_i$, $c_i$ are two gene elements and $\pi_i(b_i, c_i)$ is obtained according to the following formula:

$$\max \pi_i(b_i, c_i) = Q_i \cdot P_{cl} - b_{0i}Q_i + \tfrac{1}{2}c_{0i}Q_i^2 - U_i C_{start}$$

wherein, $P_{cl}$ is electric energy clearance price; $b_{0i}$ and $c_{0i}$ are variable cost coefficient of a unit set; $Q_i$ is output of the unit set; $C_{start}$ is the start price of the unit set which is 0 for photovoltaic or wind power generation; and $U_i$ is a Boolean variable; and wherein $P_{cl}$ and $Q_i$ are based on $\lambda^k$, which is obtained by following steps:

(a1) set k=0 and calculate $\Delta Q_{up}$ and $\Delta Q_{down}$ according to the following formula:

$$\begin{cases} \Delta Q_{up} = \sum_{i=1}^{n} Q_{i,up} - D(\lambda_{up}) \\ \Delta Q_{down} = \sum_{i=1}^{n} Q_{i,down} - D(\lambda_{down}) \end{cases}$$

where $\Delta Q_{up}$ and $\Delta Q_{down}$ are the micro-grid's power generation amounts relative to load demands at clearance prices $\lambda_{up}$ and $\lambda_{down}$, respectively, n is a number of distributed energy resources, $D(\lambda)$ is a demand curve, and $Q_{i,up}$ and $Q_{i,down}$ are power generation amounts for the $i^{th}$ distributed energy resource: if $\Delta Q_{up} < 0$, set $\lambda^k = \lambda_{up}$; if $\Delta Q_{down} > 0$, set $\lambda^k = \lambda_{down}$; and perform step (a5): otherwise perform step (a2) and (a3);

(a2) set k=1 and calculate $\lambda^k$ according to the following formula:

$$\lambda^k = \frac{\lambda_{up} - \lambda_{down}}{\Delta Q_{up} - \Delta Q_{down}} \Delta Q_{down} + \lambda_{down}$$

(a3) set k=k+1 and calculate $\Delta Q^k$ according to the following formula:

$$\Delta Q^k = \sum_{i=1}^{n} Q_i - D(\lambda^k)$$

wherein $Q_i$ is based on $\lambda^k$ from step (a2): if $\Delta Q^k > 0$, set $\lambda_{up} = \lambda^k$ and $\Delta Q_{up} = \Delta Q^k$; and interpolate $\Delta Q_{down}$ from $\Delta Q^k$ to obtain a new value for $\lambda^k$ according to step (a2): if $\Delta Q^k<0$, set $\lambda_{down}=\lambda^k$ and $\Delta Q_{down}=\Delta Q^k$; and interpolate $\Delta Q^{up}$ from $\Delta Q^k$ to obtain a new value for $\lambda^k$ according to step (a2);

(a4) if $|\lambda^k-\lambda^{k-1}|\leq\varepsilon_\lambda$, set $\lambda^k=(\lambda^k-\lambda^{k-1})/2$ and perform step (a5): otherwise perform step (a3), wherein $\varepsilon_A$ is a predefined value; and (a5) record $\lambda^k$ as $P_{cl}$ and calculate $Q_i$ according to the value of $P_{cl}$.

* * * * *